United States Patent
Jang

(10) Patent No.: US 8,046,037 B2
(45) Date of Patent: *Oct. 25, 2011

(54) SLIDE MODULE AND MOBILE TERMINAL HAVING THE SAME

(75) Inventor: Chang-Yong Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 218 days.

This patent is subject to a terminal disclaimer.

(21) Appl. No.: 12/399,765

(22) Filed: Mar. 6, 2009

(65) Prior Publication Data

US 2009/0247247 A1    Oct. 1, 2009

(30) Foreign Application Priority Data

Mar. 25, 2008    (KR) .................. 10-2008-0027550

(51) Int. Cl.
*H04M 1/00*    (2006.01)

(52) U.S. Cl. ............... 455/575.4; 455/575.1; 455/575.3

(58) Field of Classification Search ..... 455/575.1–575.4
See application file for complete search history.

(56) References Cited

U.S. PATENT DOCUMENTS

| | | | |
|---|---|---|---|
| 7,385,150 B1 | 6/2008 | Siddiqui et al. | |
| 2006/0114646 A1 | 6/2006 | Koibuchi et al. | |
| 2007/0076861 A1* | 4/2007 | Ju | 379/433.01 |
| 2008/0058039 A1* | 3/2008 | Lee et al. | 455/575.4 |
| 2008/0161075 A1* | 7/2008 | Kim et al. | 455/575.4 |
| 2008/0254844 A1* | 10/2008 | Lee | 455/575.4 |

FOREIGN PATENT DOCUMENTS

| | | |
|---|---|---|
| CN | 2733766 Y | 10/2005 |
| CN | 2819718 Y | 9/2006 |

* cited by examiner

*Primary Examiner* — Huy Phan
*Assistant Examiner* — Stamford Hwang
(74) *Attorney, Agent, or Firm* — Birch, Stewart, Kolasch & Birch, LLP

(57) ABSTRACT

A mobile terminal including a first body, a second body slidably moveable with respect to the first body such that the first body is moved between a closed position and an open position, a connector electrically connecting the first body to the second body, and a slide module connecting the first body to the second body to allow the second body to move with respect to the first body between the closed position and the open position is provided. The slide module includes a first slide member connected to the first body, a second slide member connected to the second body, the second slide member being slidably connected to the first slide member, and a cover unit disposed between the first and second slide members, the cover unit being configured to prevent exposure of the connector when the first body is in the open position.

21 Claims, 14 Drawing Sheets

SLIDE MODULE AND MOBILE TERMINAL HAVING THE SAME

CROSS-REFERENCE TO RELATED APPLICATIONS

The present application claims priority to Korean Application No. 10-2008-0027550, filed on Mar. 25, 2008, the entire contents of which is hereby incorporated by reference in its entirety.

BACKGROUND OF THE INVENTION

1. Field of the Invention

The present invention relates generally to a slide module and a mobile terminal having the same. More particularly, the present invention relates to a slide module with a cover unit for covering a connector so that the connector is not exposed in an open position, and a mobile terminal having the same.

2. Description of Related Art

A mobile terminal is a device which may be configured to perform various functions. Examples of such fictions include data and voice communications, capturing images and video via a camera, recording audio, playing music files via a speaker system, and displaying images and video on a display. Some terminals include additional functionality that support game playing, while other terminals are configured as multimedia players. More recently, mobile terminals have been configured to receive broadcast and multicast signals that permit viewing of content such as videos and television programs.

Efforts are ongoing to support and increase the functionality of mobile terminals. Such efforts include software and hardware improvements. For example, a user interface environment is provided to allow users to easily and conveniently search for and/or select functions. Also, because users consider their mobile terminal to be a personal portable device that can express their personality, many different designs for mobile terminals have been developed. For example, mobile terminals come in many different types such as folder types, slide types, swivel types, and the like.

Of the various types of mobile terminals, the slide type mobile terminal is configured such that first and second bodies move relative to each other between a closed position in which the first and second bodies are disposed to overlap with each other and in an open position in which at least a portion between the first and second bodies is exposed.

A connector is arranged where the first and second bodies overlap each other in the open position. As the relative movement distance of the first and second bodies increases, a space where the connector may be disposed is reduced, and if the relative movement distance of the first and second bodies increases by more than a certain distance, a portion of the connector becomes exposed, thereby degrading the aesthetics of the mobile terminal and subjecting the connector to the environment.

BRIEF SUMMARY OF THE INVENTION

Accordingly, one aspect of the present invention is to address the above-noted problems and other problems, including increasing a relative movement distance of first and second bodies without degrading the aesthetics of the mobile terminal by covering an exposed portion of a connector when the first body is moved into the open position.

To achieve these and other advantages and in accordance with the purpose of the present invention, as embodied and broadly described herein, the present invention provides in one aspect a mobile terminal including a first body, a second body slidably moveable with respect to the first body such that the first body is moved between a closed position and an open position, a connector electrically connecting the first body to the second body, and a slide module connecting the first body to the second body to allow the second body to move with respect to the first body between the closed position and the open position. The slide module includes a first slide member connected to the first body, a second slide member connected to the second body, the second slide member being slidably connected to the first slide member, and a cover unit disposed between the first and second slide members, the cover unit being configured to prevent exposure of the connector when the first body is in the open position.

To achieve these and other advantages and in accordance with the purpose of the present invention, as embodied and broadly described herein, the present invention provides in another aspect a slide module for a mobile terminal having a first body, a second body slidably connected to the first body such that the first body is moveable between a closed position and an open position, and a connector electrically connecting the first body to the second body. The slide module includes a first slide member connectable to the first body, a second slide member connectable to the second body, the first slide member being slidably connected to the second slide member to allow the first and second bodies to move between the closed and open position, the first and second slide members being configured to allow the connector to pass therethrough, and a cover unit configured to prevent exposure of the connector when the first body is in the open position, the cover unit being disposed between the first and second slide members.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

A slide module and a mobile terminal having the same according to exemplary embodiments of the present invention will now be described in detail with reference to the accompanying drawings.

Figure 1:
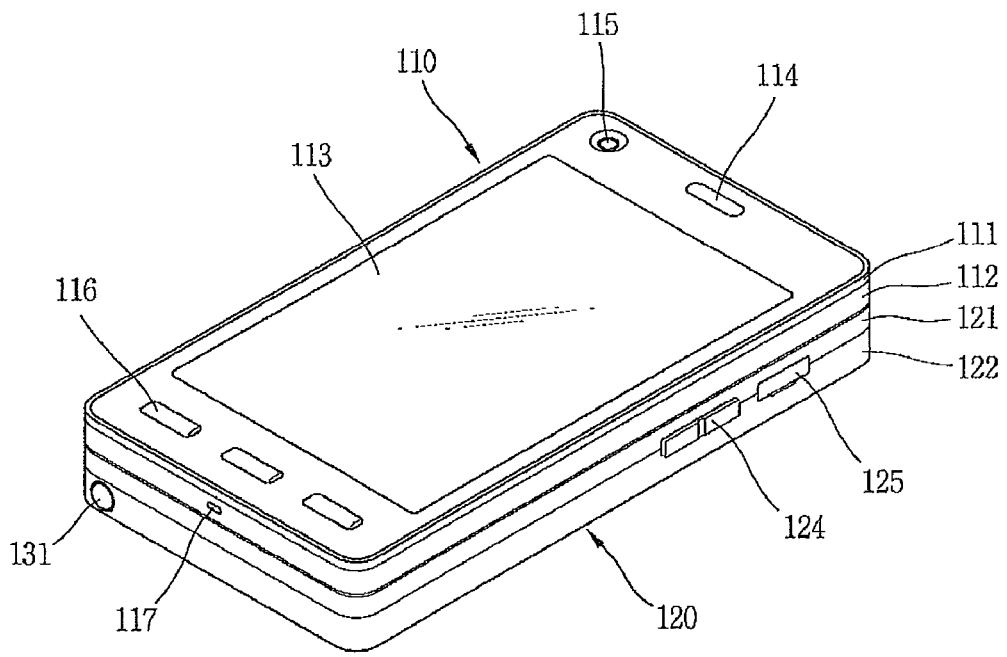
FIG. 1 is a front perspective view of the mobile terminal according to an exemplary embodiment of the present invention in an closed position.
Figure 2:
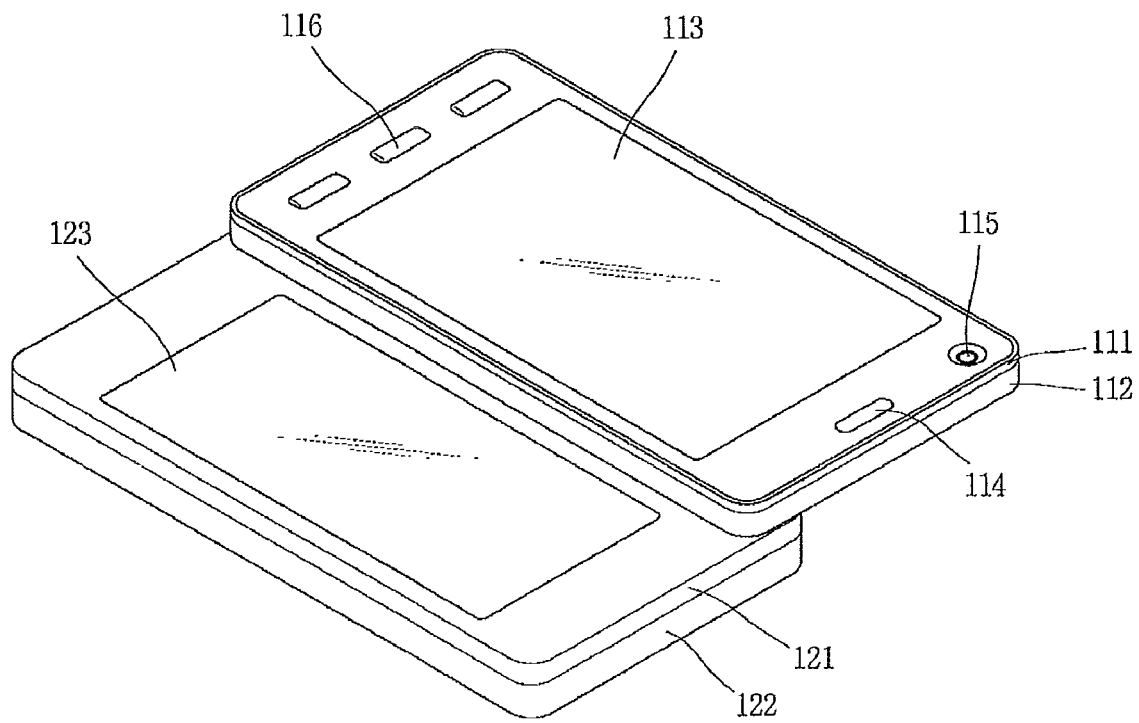
FIG. 2 is a front perspective view of the mobile terminal of FIG. 1 in an open position.

FIGS. 1 and 2 are front perspective views of a mobile terminal according to an exemplary embodiment of the present invention. The mobile terminal according to an embodiment of the present invention includes a first body 110, and a second body 120 that is slidably moved along at least one direction with respect to the first body 110.

A state in which the first terminal body 110 is disposed to overlap with the second terminal body 120, as shown in FIG. 1, may be called a closed configuration where the first body is in a closed position, and a state in which at least a portion between the first and second bodies 110 and 120 is exposed, as shown in FIG. 2, may be called an open configuration where the first body is in an open position. As shown in FIG. 2, the first and second bodies 110 and 120 may be configured to be slidably moved in a direction perpendicular to the lengthwise direction of the first and second bodies 110 and 120.

A case, which may also be referred to as a housing, a casing, a cover, or the like, defining the external appearance of the first body 110 includes a front case 111 and a rear case 112. Various electronic components may be installed in a space formed by the front case 111 and the case 112. At least one intermediate case (not shown) may be disposed between the front case 111 and the rear case 112 to further divide the space between the front case 111 and the rear case 112. The case can be formed by injection-molding a synthetic resin, or made of a metallic material such as stainless steel (STS), titanium (Ti), or the like.

On the first body 110, specifically, on the front case 111, there may be disposed a first display unit 113, a first audio output unit 114, a first image input unit 115, a first manipulation unit 116, and an audio input unit 117 (See FIG. 1). The display unit 113 may include a Liquid Crystal Display (LCD) module, an Organic Light Emitting Diode (OLED) module, or the like. Further, the display unit 113 may include a touch screen that allows inputting of information by user's touching. The first audio output unit 114 may be implemented in the form of a receiver or a speaker, and the first image input unit 115 may be implemented in the form of a camera module for capturing an image or video of a user or another subject. The first manipulating unit 116 may receive a command for controlling an operation of the mobile terminal according to an exemplary embodiment of the present invention, and the audio input unit 117 may be implemented in the form of, for example, a microphone to receive user's voice or other sounds.

Like the first body 110, the case of the second body may include a front case 121 and a rear case 122. A second display unit 123 may be disposed on the second body 120, specifically, on a front surface of the front case 121. The second display unit 123 may be implemented in the form of a touch screen, and information inputted to the second display unit 123 may be displayed on the first display unit 113. For example, visual information in the form of a QWERTY keypad may be outputted to the second display unit 123, and when key input information such as a character, a number, a symbol, or the like is inputted, the same can be displayed on the first display unit 113. A second manipulating unit 124 and an interface 125 may be disposed on at least one of the front case 121 and the rear case 122.

The first and second manipulating units 116 and 124 may be any conventional inputting devices so long as they allow a user to perform manipulation in a tactile manner. For example, the first and second manipulating units 116 and 124 may be implemented as a dome switch or a touch pad that receives a command or information according to a push or touch manipulation by the user. Similarly, the first and second manipulating units may be implemented in a manner to be manipulated by other movements such as a wheel for rotating a key, a jog type, a joystick, or the like.

In terms of function, the first manipulating unit 116 may be operated to input a command such as start, end, scroll, etc., and the second manipulating unit 124 may operate as a hot key for performing a particular function such as activation of the first image input unit 115.

The interface 125 serves as a path for allowing the mobile terminal to exchange data with an external device. For example, the interface 125 may be implemented as one of a connection port (terminal) for connecting an ear phone to the mobile terminal via a fixed or wireless means, a an IrDA port, a BLUETOOTH port, a wireless LAN port, or a power supply port that supplies power to the mobile terminal, or the like. The interface 125 may be a card socket (or receiving unit) for accommodating an external card, such as a Subscriber Identity Module (SIM), a User Identity Module (UIM), a memory card for storing information, or the like.

Figure 3:
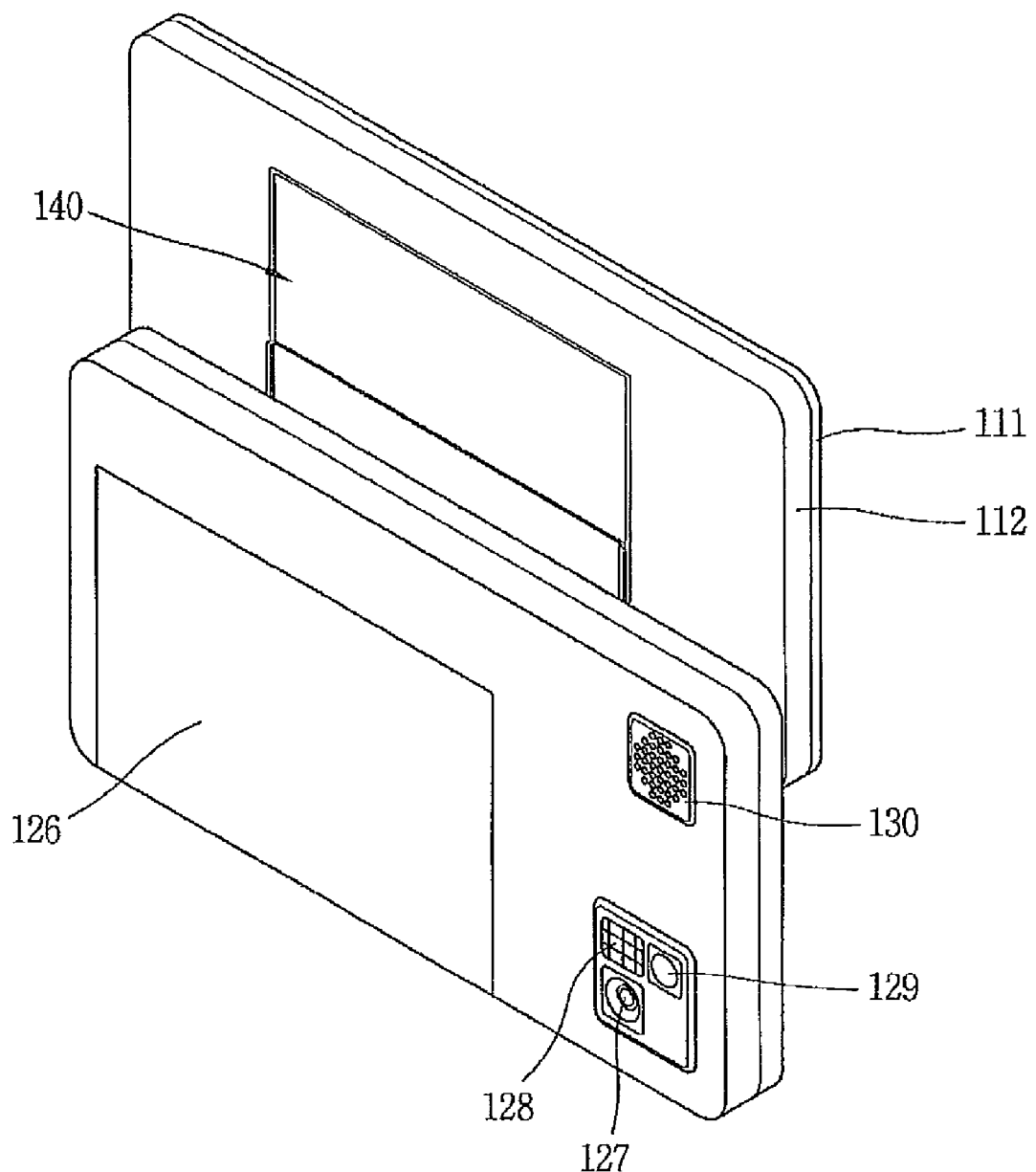
FIG. 3 is a rear perspective view of the mobile terminal of FIG. 1.

FIG. 3 is a rear perspective view of the mobile terminal according to an embodiment of the present invention. With reference to FIG. 3, a power supply unit 126 for supplying power to the mobile terminal is mounted at the rear case 122 of the second body 120. The power supply unit 126 may be detachably combined to perform re-charging as a rechargeable battery.

As also shown in FIG. 3, a second image input unit 127 may be located ate the rear case 122 of the second body 120. The second image input unit 127 may have an image capture direction that is substantially the opposite to that of the first image input unit 115 (See FIG. 1), and may be a camera supporting a different number of pixels from that of the first image input unit 115. For example, the first image input unit 115 may be used for low resolution (i.e., supporting a relatively small number of pixels) to quickly capture an image (or video) of the user's face and immediately transmit the same to the other party during video conferencing or the like. Meanwhile, the second image input unit 127 may be used for high resolution (i.e., supporting a relatively large number of pixels) in order to capture more detailed (higher quality) images (or video) which typically do not need to be transmitted immediately.

A flash 128 and a mirror unit 129 are disposed to be adjacent to the second image input unit 127. The flash 128 provides light to a subject when an image of the subject is being captured by the second image input unit 128. The mirror unit 129 allows the user to see himself when he wants to capture his own image (self-image capturing) by using the second image input unit 127.

A second audio output unit 130 may be additionally disposed on the rear case 122. The second audio output unit 130 may implemented a stereophonic function in conjunction with the first audio output unit (114 in FIG. 1), or may be used for a call in a speaker phone mode.

In addition to an antenna for receiving and transmitting a call, a broadcast signal reception antenna (131 in FIG. 1) may be disposed at one side of the first body 110 or second body 120. The antenna 131 may be installed to be protractible from the second body 120.

While various components, including the second image input unit 127, have been described as being part of the second body 120, the present invention is not so limited. For example, one or more of the components (e.g., 127 to 130), which are described as being disposed on the rear case 122, may be disposed on the first body 110, particularly, on the rear case 112. If the mobile terminal is so modified, those elements disposed on the rear case 112 can be protected (or covered) by the second body 120 in the closed position. In addition, even if the second image input unit 127 is not provided, the first image input unit 115 may be configured to rotate (or otherwise be moved) to allow image capturing in various directions.

A portion of a slide module 140 for slidably coupling the first body 110 and the second body 120 is disposed at the rear case 112 of the first body 110. The construction of the slide module 140 according to a first exemplary embodiment will now be described in detail with reference to FIGS. 4 to 6.

Figure 4:
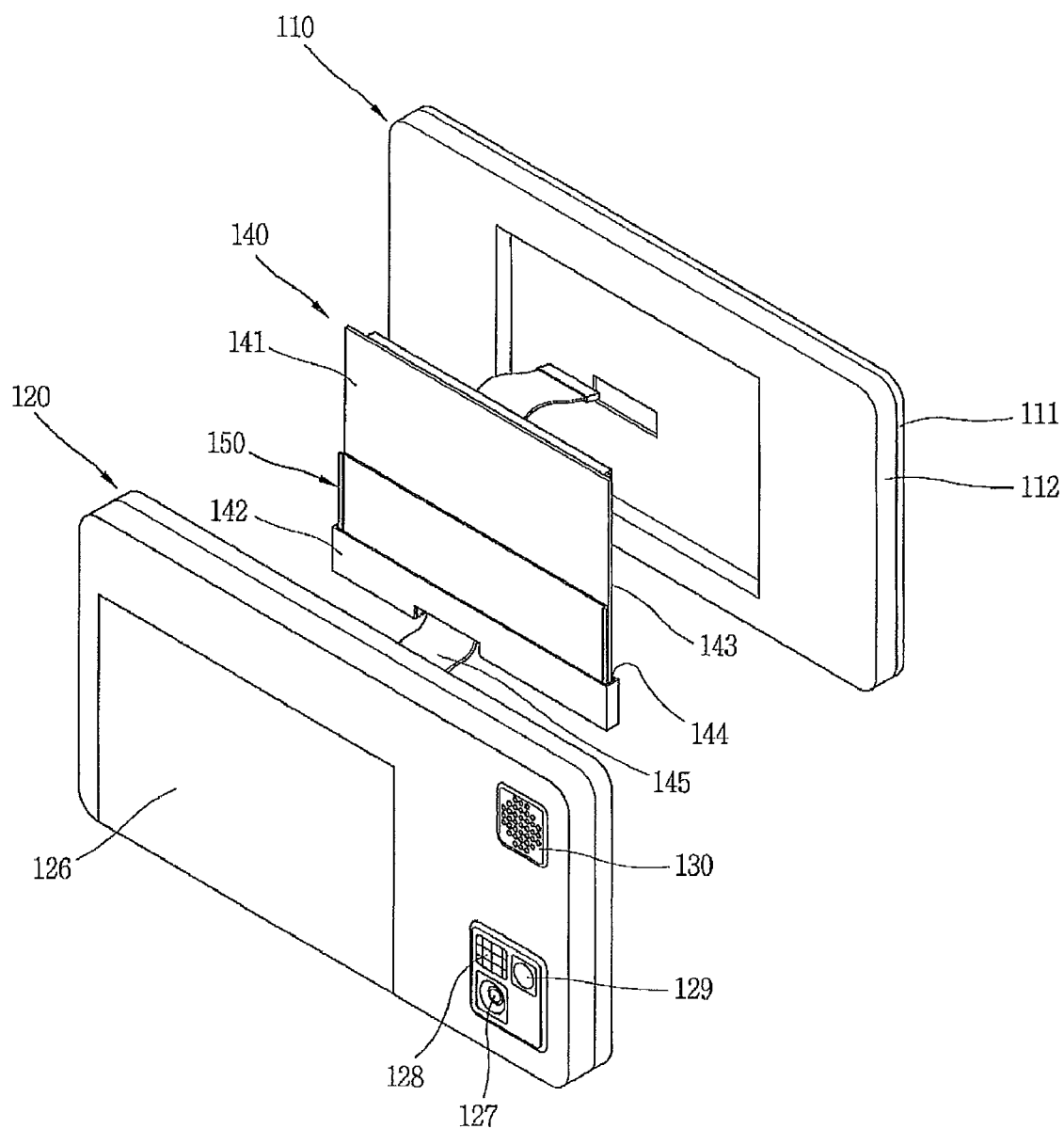
FIG. 4 is an exploded perspective view of the mobile terminal of FIG. 3.

FIG. 4 is an exploded perspective view of the mobile terminal of FIG. 3, showing the construction of the slide module 140. The slide module 140 includes a first slide member 141 fixed to the first body 110, a second slide member 142 fixed to the second body 120, and a cover unit 150 disposed between the first and second slide members 141 and 142. The first and second slide members 141 and 142 are slidably coupled. In this exemplary embodiment, the first slide member 141 may be configured to have a larger area than the second slide member 142.

The first and second bodies 110 and 120 may be electrically connected by a connector 145, and an FPCB (Flexible Printed Circuit Board) that can be deformable according to a relative movement of the first and second bodies 110 and 120 may be, for example, used as the connector 145. The connector 145 connects the first and the second bodies 110 and 120 by penetrating at least one of the first and second slide members 141 and 142. In this exemplary embodiment, one end of the connector 145 is connected to the first body 110, and the other end of the connector 145 is connected to the second body by passing through the slide module 140.

A slide rail 143 is formed on an edge of the first slide member 141, and a slide groove 144 is formed at the second slide member and extends toward the first body 110 to cover the slide rail 143. A connector hole 146 is formed on the first slide member 141 allowing the connector 145 to penetrate therethrough. Particularly, one end of the connector 145 is connected to the first body 110, and the other end of the connector 145 is connected to the second body by passing through the connector hole 146. In this configuration, the connector hole 146 receives a portion of the connector 145 in a first state (i.e., closed position), and guides the movement of the connector 145 when the first and second slide members 141 and 142 are moved relative to each other.

When the first and second bodies 110 and 120 are in the open position, as shown in FIGS. 3 and 4, a portion of the connector 145 would normally be exposed via the connector hole 146 of the first slide member 141 except that the slide module 140 according to the present invention includes a cover unit 150 to cover the connector 145 in the open position to prevent the connector 145 from being exposed in the open position. The cover unit 150 is connected to the first and second slide members 141 and 142 to open and close the connector hole 146 according to a relative movement of the first and second slide members 141 and 142.

Figure 5:
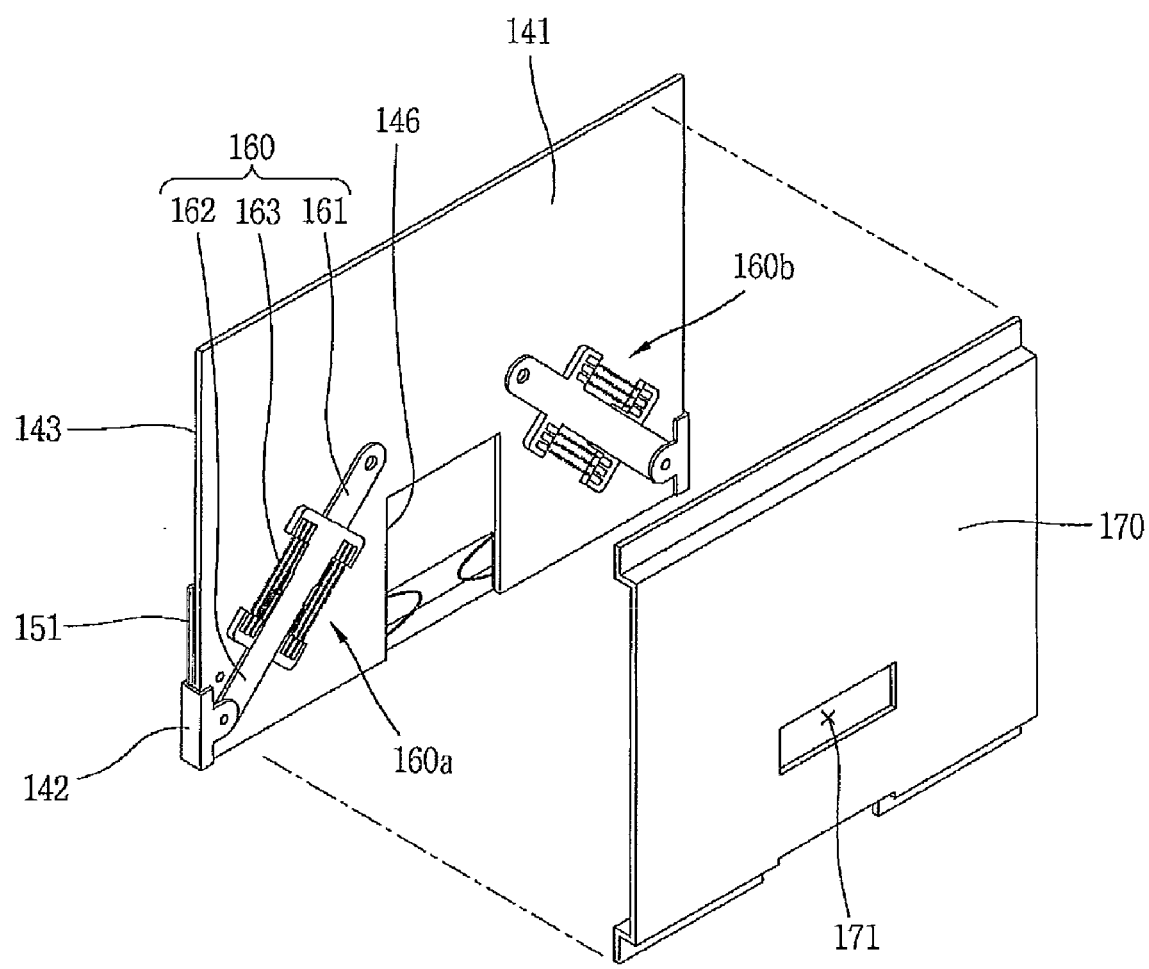
FIG. 5 is a perspective view of a slide module according to a first exemplary embodiment of the present invention.
Figure 6:
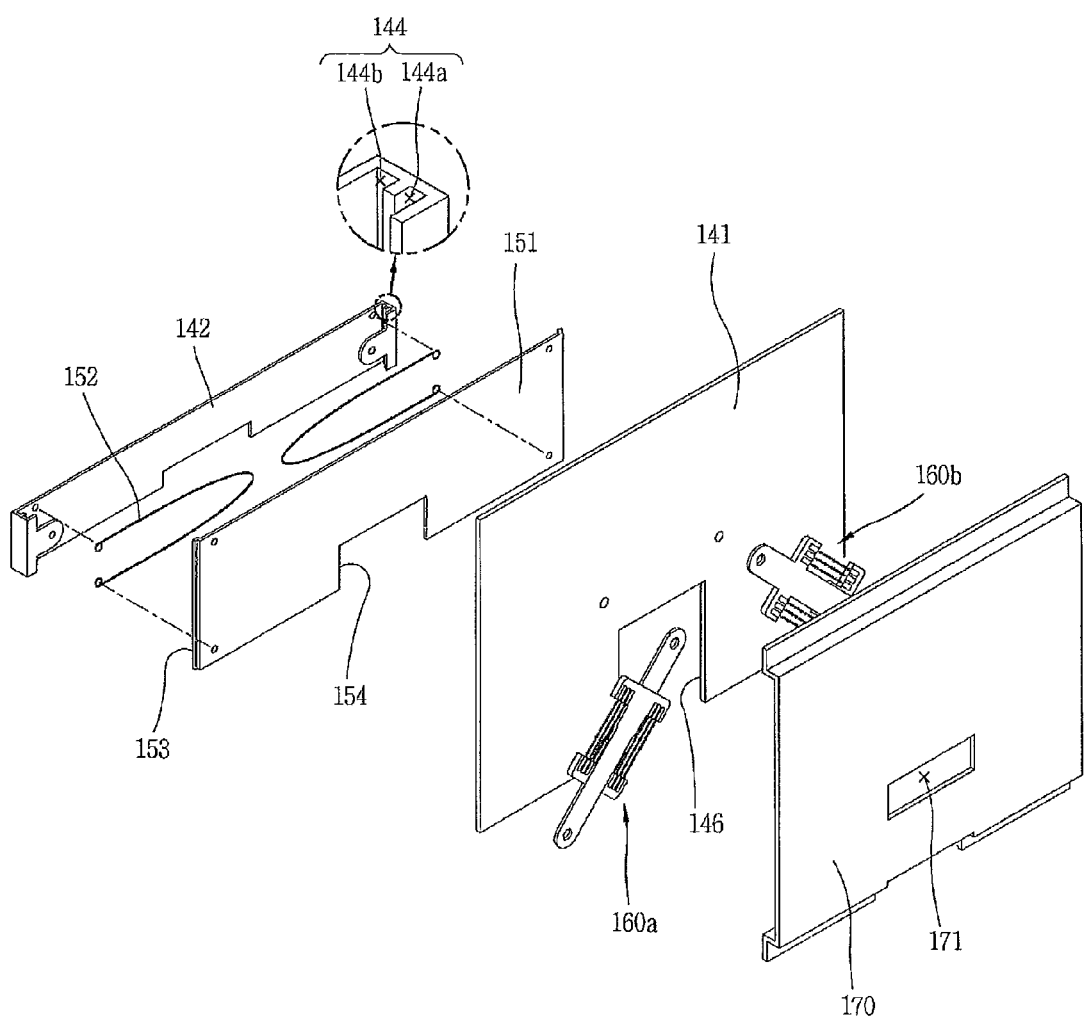
FIG. 6 is an exploded perspective view of the slide module in FIG. 5.

The cover unit 150 covers the connector 145 so that the connector 145 is not exposed when the first body 110 is in the open position. The construction and operation of the cover unit 150 will now be described in detail. FIG. 5 is a perspective view of the slide module 140 according to the first exemplary embodiment of the present invention and is viewed from the first body 110 toward the second body 120, and FIG. 6 is an exploded perspective view of the slide module 140 of FIG. 5.

The cover unit 150 covers and uncovers the connector hole 146 by being interworked with a relative movement of the first and second slide members 141 and 142 to provide a space to receive a portion of the connector 145 when the first body 110 is in the closed position and to cover the connector 145 when the first body 110 is in the open position.

The cover unit 150 may include a cover body unit 151 that is slidably connected to the second slide member 142 and a connection unit 152 disposed between the cover body unit 151 and the second slide member 142. The cover body unit 151 may be formed as a plate and includes a slide rail 153 at an edge of the cover body unit 151. The cover body unit 151 may include a connector hole 154 to provide a space to receive a portion of the connector 145 when the first body 110 is in the closed position.

The slide groove 144 of the second slide member 142 includes a first slide groove 144a in which the slide rail 153 of the cover body unit 151 is inserted and a second slide groove 144b in which the slide rail 143 of the first slide member 141 is inserted. With such a configuration, the first and second slide members 141 and the cover body unit 151 may all slide with respect to each other. While the second slide groove 144b has been shown on the second slide member 142, the second slide groove 144b could be provided on the cover body unit 151 instead.

As shown in FIG. 6, the connection unit 152 may include one or more torsion springs disposed between the cover body unit 151 and the second slide member 142 to connect the cover body unit 151 to the second slide member. For example, torsion springs 152a and 152b may be provided at opposite ends of the cover body unit 151 and the second slide member 142. One end of the torsion spring 152a is connected to the second slide member 142, and the other end of the torsion spring 152a is connected to the cover body unit 151. Torsion spring 152b is similarly attached.

The slide module 140 may further include an elasticity providing unit 160 to apply elastic force to the first and second slide members 141 and 142 to assist in moving the first and second bodies 110 and 120 between the closed position and the open position according to the relative movement of the first and second slide members 141 and 142. The elasticity providing unit 160 may be disposed between the first slide member 141 and the first body 110, particularly, on a front surface of the first slide member 141, so as not to be exposed in the open position. In particular, the elasticity providing unit 160 may be disposed between the front surface of the first slide member 141 and an inner surface of the second slide groove 144b. According to this first exemplary embodiment, the elasticity providing unit 160 may include first and second elasticity providing units 160a and 160b disposed at opposite sides of the first slide member 141.

The elasticity providing unit 160 includes a first rod 161 with one end rotatably connected to the first slide member 141, a second rod 162 with one end rotatably connected to the second slide member 142, the second rod 162 being linearly movable on the first rod 161, and a spring 163 mounted between the other end of the first rod 1651 and the other end of the second rod 162 to generate elastic force between the first and second rods 161 and 162. In this exemplary embodiment, one end of the first rod 161 is connected to the front surface of the first slide member 141, and one end of the second rod 162 is connected to an inner surface of the slide groove 144 formed at the second slide member 142.

The first slide member 141 may further include a cover member 170 that covers the cover unit 150 and the elasticity providing unit 160. The cover member 170, which serves to fasten the first body 110 to the first slide member 141 and prevents an interference between the elasticity providing unit 160 and the first body 110, has a plate form with both ends bent toward the first slide member 141. A through hole 171 is formed on the cover member 170 to allow the connector 145 to penetrate therethrough.

Having described the first exemplary embodiment of the slide module 140, movement of the components of the slide module 140 when the first body 110 is moved between the closed and open positions will be described with reference to FIGS. 7A, 7B, 8A, 8B, 9A, and 9B. In particular, FIGS. 7A and 7B are rear and front views, respectively, of the slide module 140 when the first body 110 is in the closed position.

Figure 7A:
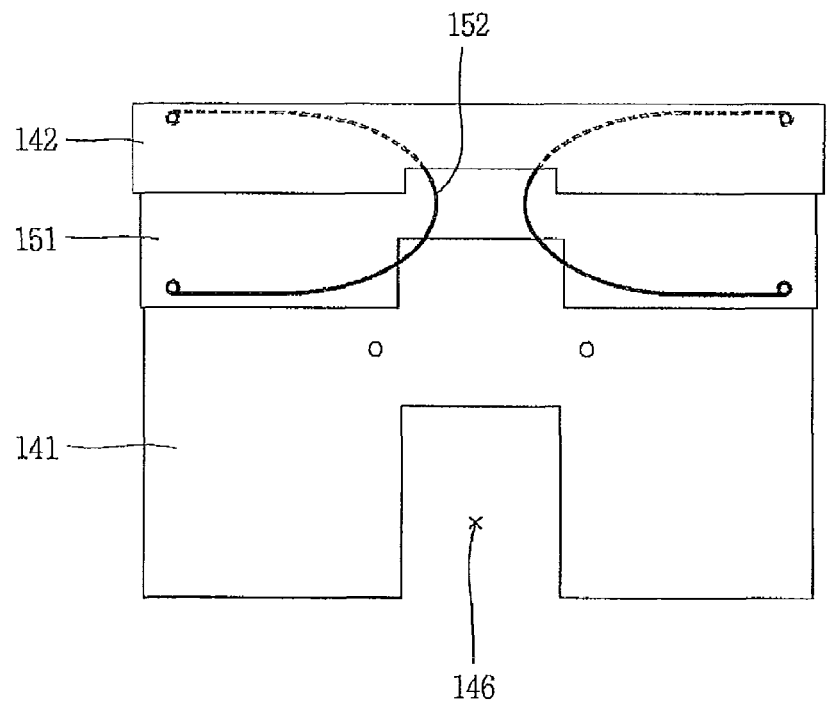
FIGS. 7A and 7B are rear and front views, respectively, of the slide module of FIG. 5 in a closed position.
Figure 7B:
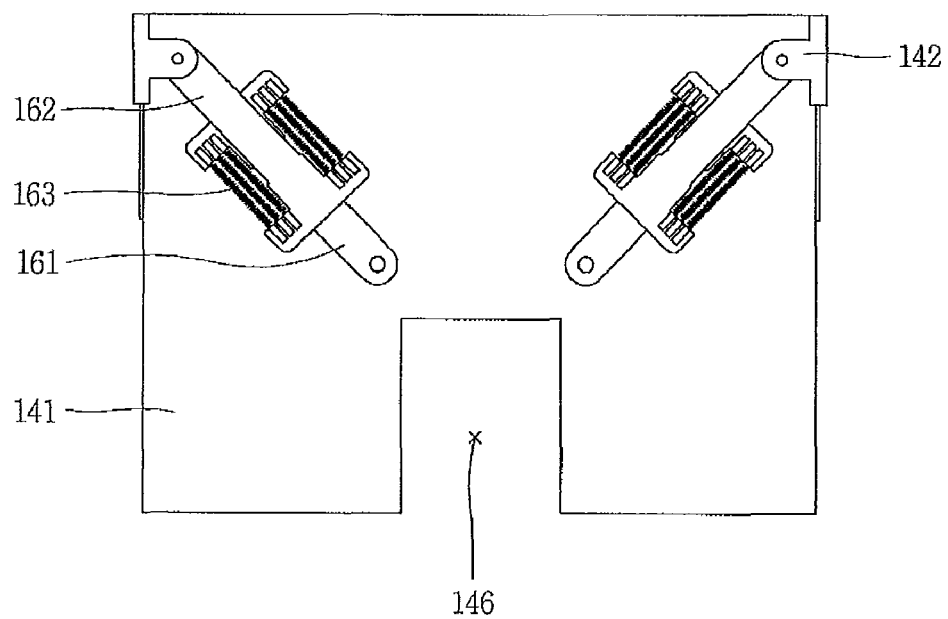

As shown in FIG. 7A, the second slide member 142 and the cover body unit 151 are positioned at an upper region of the first slide member 141 when the first body 110 is in the closed position. While in the closed position, the connector hole 146 is open, and the connector 145 is positioned at an upper end portion of the connector hole 146. The second slide member 142 is supported by the torsion spring 152 so as to be positioned at an upper region of the cover body unit 151. As shown in FIG. 7B, the first and second rods 161 and 162 of the elasticity providing unit 160 are disposed to be spaced apart.

Figure 8A:
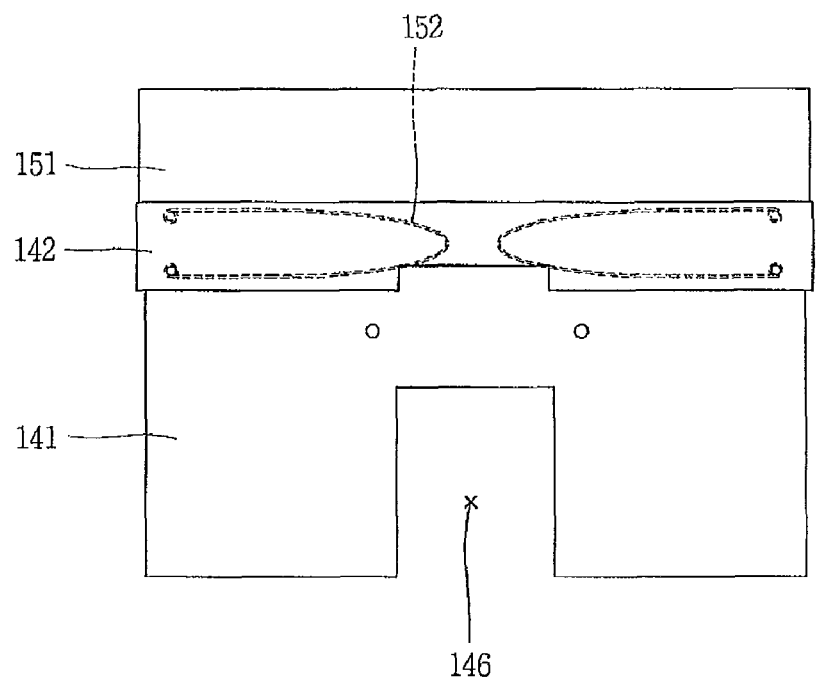
FIGS. 8A and 8B are rear and front views, respectively, of the slide module of FIG. 5 positioned between the closed position and an open position.
Figure 8B:
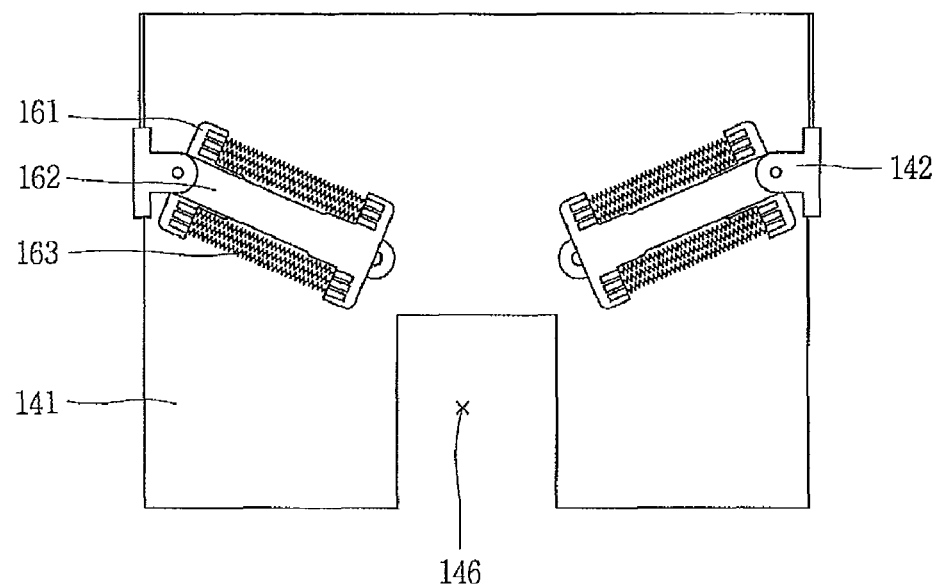

If the user applies force to the first body 110 or the second body 120, the first and second slide members 141 and 142 start to slide relative to each other to move the slide module 140 to an intermediate position as shown in FIGS. 8A and 8B. At first, when force stronger than the elastic force of the torsion spring 152 is applied to the second slide member 142, only the second slide member 141 moves while the cover body unit 151 is maintained at its current position. Accordingly, the second slide member 142 is positioned at a lower region of the cover body unit 151.

With reference to FIG. 8B, as the second slide member 142 moves, the first and second rods 161 and 162 also move such that the distance between the other end of the first rod 161 and that of the second rod 162 increases. Accordingly, the spring 163 disposed between the first and second rods 161 and 162 is tensely deformed, and an elastic restoration force is generated at the spring 163 in the direction in which the spring 163 is compressed.

Figure 9A:
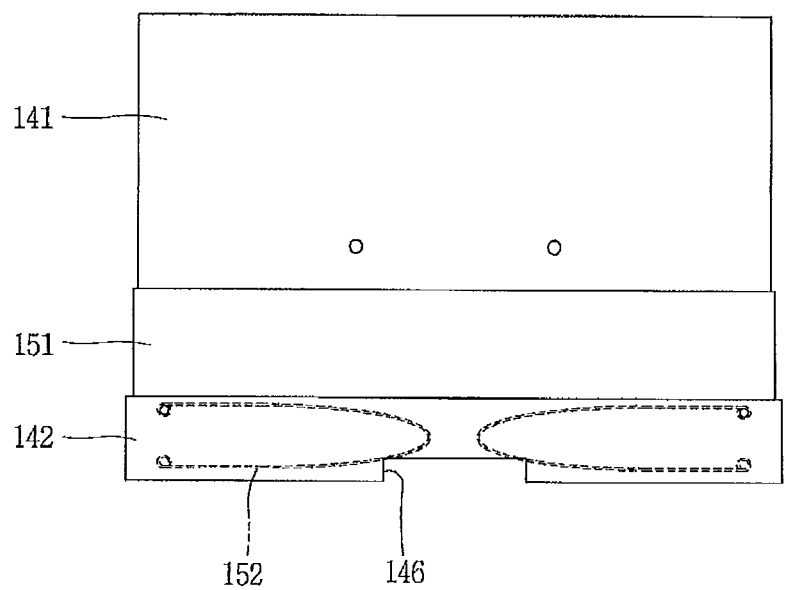
FIGS. 9A and 9B are rear and front views, respectively, of the slide module of FIG. 5 in the open position.
Figure 9B:
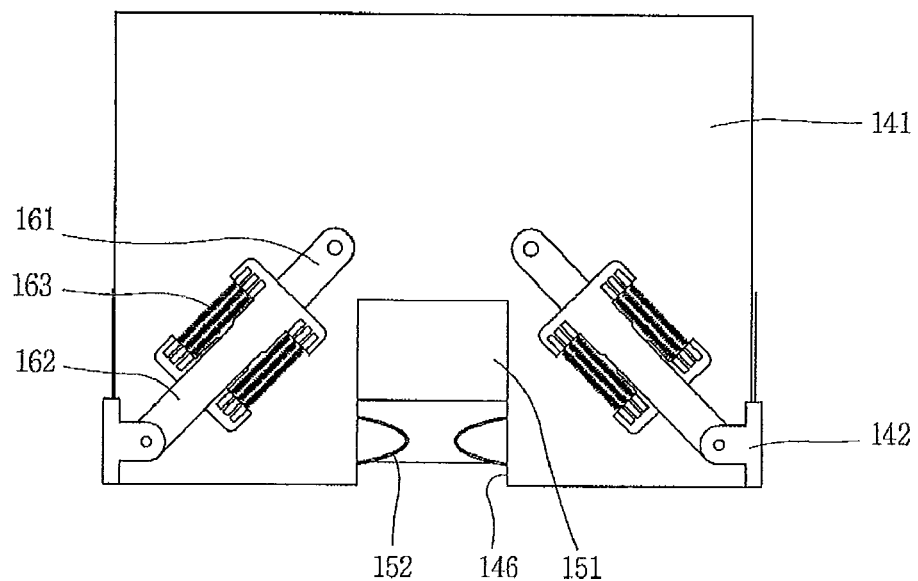

As the first body 110 is further moved from the closed position to the open position the first and second rods 161 and 162 are moved linearly in the direction in which they become close due to the elastic restoration force of the spring 163, and the first and second rods 161 and 162 applies force to move the first and second slide members 141 and 142 to assist in moving the first body 110 toward the open position. As a result, the first and second slide members 141 and 142 are relatively moved by the elastic restoration force of the spring 163 from the intermediate position into the open position, as shown in FIG. 9B.

Meanwhile, when the torsion spring 152 is compressed by more than a certain level, the second slide member 142 is moved on the first slide member 141 together with the cover body unit 151. The movement of the cover body unit 151 is dependent upon the movement of the second slide member 142 and is moved toward the connector hole 146. When the movement of the second slide member 142 is completed, the connector hole 146 is closed by the cover body unit 151.

While the cover unit 150 and the elasticity providing unit 160 have been described as all being mounted in the slide module 140, if only the cover unit 150 is mounted on the slide module 140, the cover unit 150 may be operated by force applied to the second slide member 142 by the user.

Figure 10:
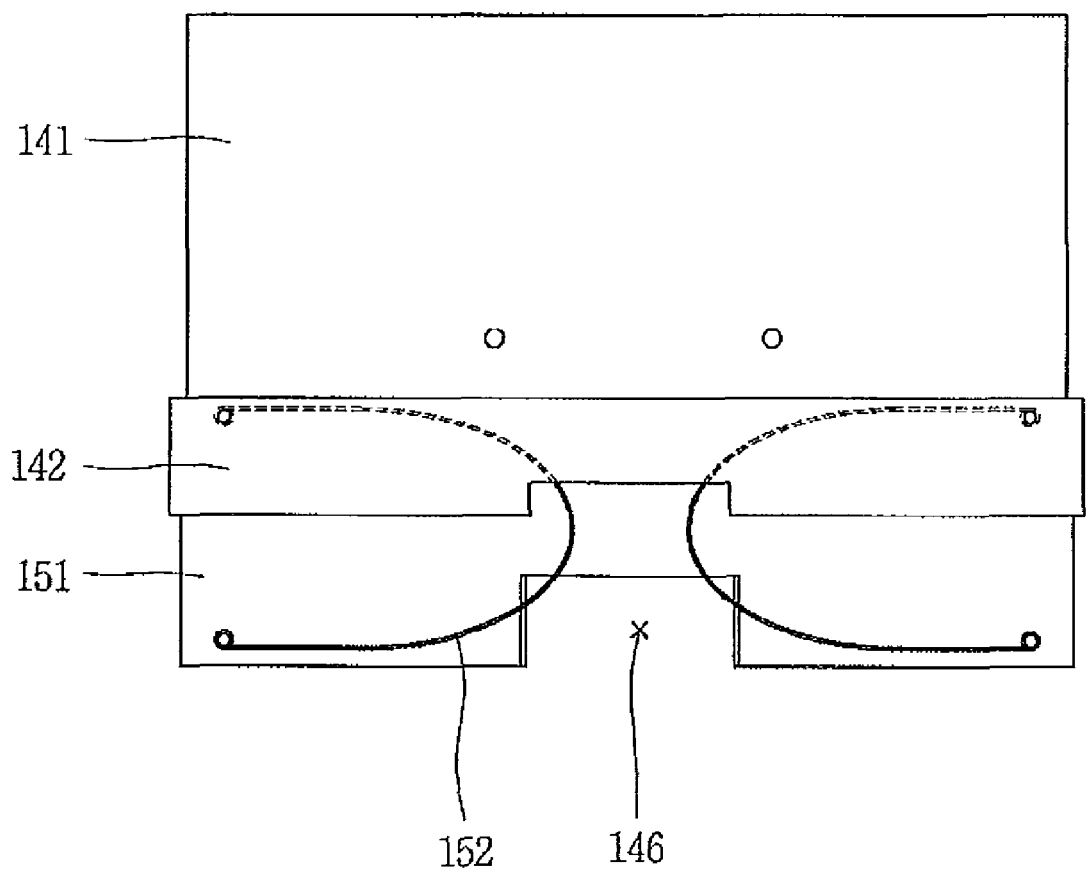
FIG. 10 is a rear view of the slide module of FIG. 5 in which the first body of the mobile terminal is being moved from the open position to the closed position.

When the user applies force to the first and second bodies 110 and 120 to move the first body 110 from the open position toward the closed position open, the second slide member 142 is moved upwardly, as shown in FIG. 10. In this situation, the compressed state of the torsion spring 152 is released, and the second slide member 142 is moved separately from the cover body unit 151 while the cover body unit 151 maintains its position. When the second slide member 142 reaches a position at an upper region of the cover body unit 151, the second slide member 142 and the cover body unit 151 can be integrally moved upwardly. The second slide member 142 and the cover body unit 151 keep moving together until the cover body unit 151 and second slide member 142 are in the upper position, as shown in FIG. 7A.

Because the operation of the elasticity providing unit 160 moving from the lower position to the upper position is functionally the same as the movement from the upper position to the lower position, further description is omitted.

Figure 11A:
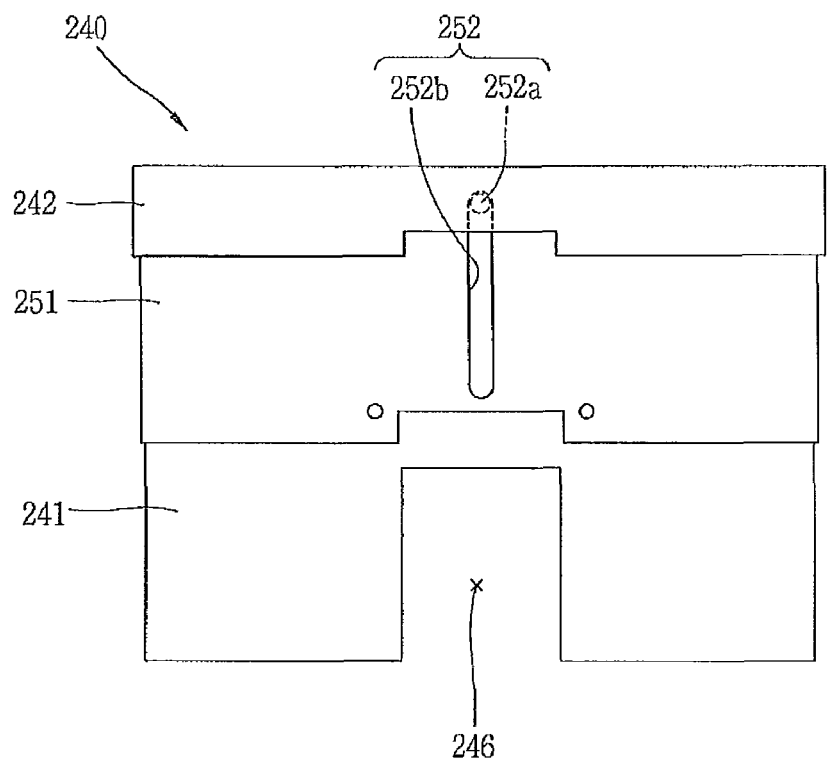
FIGS. 11A to 11C are rear views of a slide module according to a second exemplary embodiment of the present invention where the first body of the mobile terminal is being moved between the closed position and the open position.
Figure 11B:
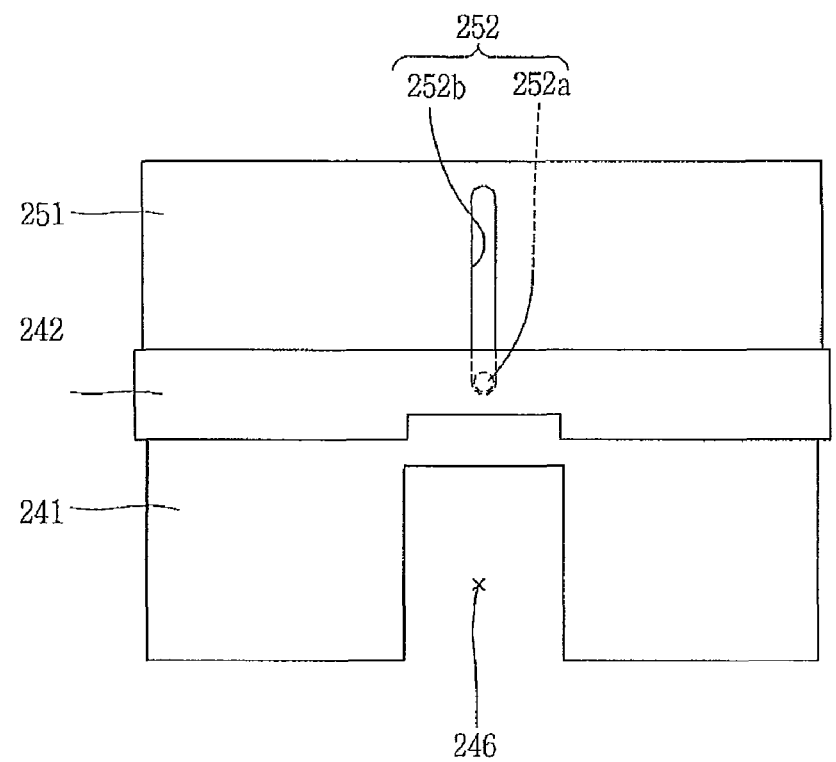
Figure 11C:
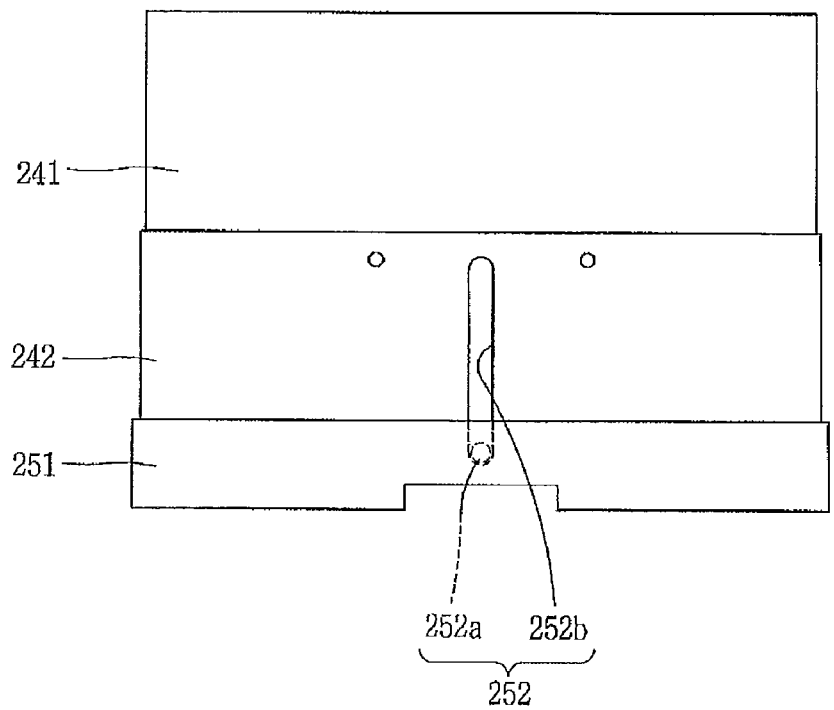
Figure 12:
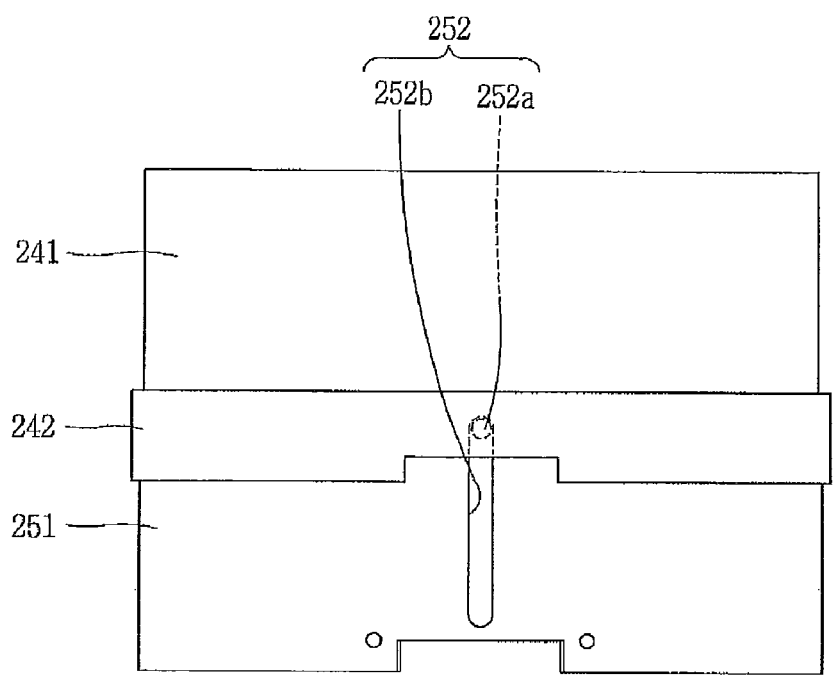
FIG. 12 is a rear view of the slide module of FIGS. 11A-11C in which the first body of the mobile terminal is being moved from the open position to the closed position.

FIGS. 11A to 11C are rear views of a slide module 240 according to a second exemplary embodiment of the present invention. FIGS. 11A to 11C sequentially show the process in which the first and second slide members 141 and 142 are moved relative to each other when the first body 110 is moved from the closed position to the open position, and FIG. 12 shows a state in which the first and second slide members 141 and 142 are moved relative to each other when the first body 110 is moved from the open position to the closed position.

The slide module 240 has the same construction as that in the first exemplary embodiment of the present invention, except for the particulars of a connection unit 252. Thus, a rear view of the slide module 240 is omitted. In this exemplary embodiment, the connection unit 252 includes a slot 252b formed at the cover body unit 251 and a protrusion 252a formed at the second slide member 242. The slot 252b has a lengthwise direction that is parallel to a movement direction of the second slide member 242. The protrusion 252a is inserted in the slot 252b and is caught by one end of the slot 252b when the second slide member 242 moves relative to the connection unit 252.

As for the operation of the slide module 240, the second slide member 242 and the cover body unit 252 are positioned at an upper region of the first slide member 241, as shown in FIG. 11A, when the first body 110 is in the closed position. When the first body 110 is initially moved from the closed position to the open position, only the second slide member 242 starts to move and the cover body unit 251 is maintained at its position. In this exemplary embodiment, the protrusion 252a is moved along the slot 252b until it is caught by one end of the slot 252b.

Accordingly, once the protrusion 252a is caught by one end of the slot 252b, the second slide member 242 moves together with the cover body unit 251 on the first slide member 241. Thus the movement of the cover body unit 251 is dependent upon the movement of the second slide member 242 to move toward the connector hole 246. When the movement of the second slide member 242 is completed, the connector hole 246 is covered by the connector body unit 251.

When the first body 110 is moved from the open position to the closed position, the second slide member 242 is moved from the lower position, as shown in FIG. 11C, toward the upper position. Again, only the second slide member 242 starts to move and the cover body unit 251 is maintained at its position. In this exemplary embodiment, the protrusion 252a is moved along the slot 252b until it is caught by the other end of the movement slot 252b, as shown in FIG. 12. Accordingly, once the protrusion 252a is caught by the other end of the slot 252b, the second slide member 242 moves together with the cover body unit 251 on the first slide member 241 to the upper position, as shown in FIG. 11A.

Figure 13:
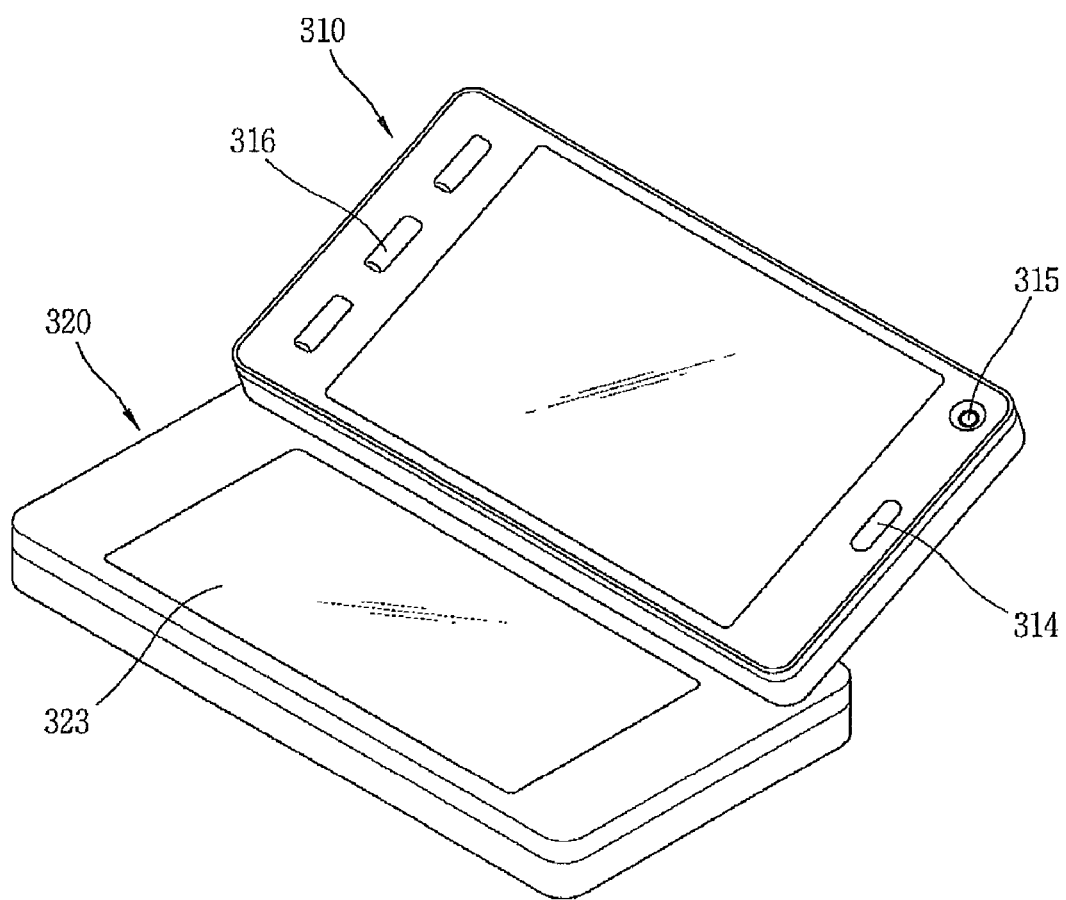
FIG. 13 is a perspective view of a mobile terminal with a slide module according to a third exemplary embodiment of the present invention.
Figure 14:
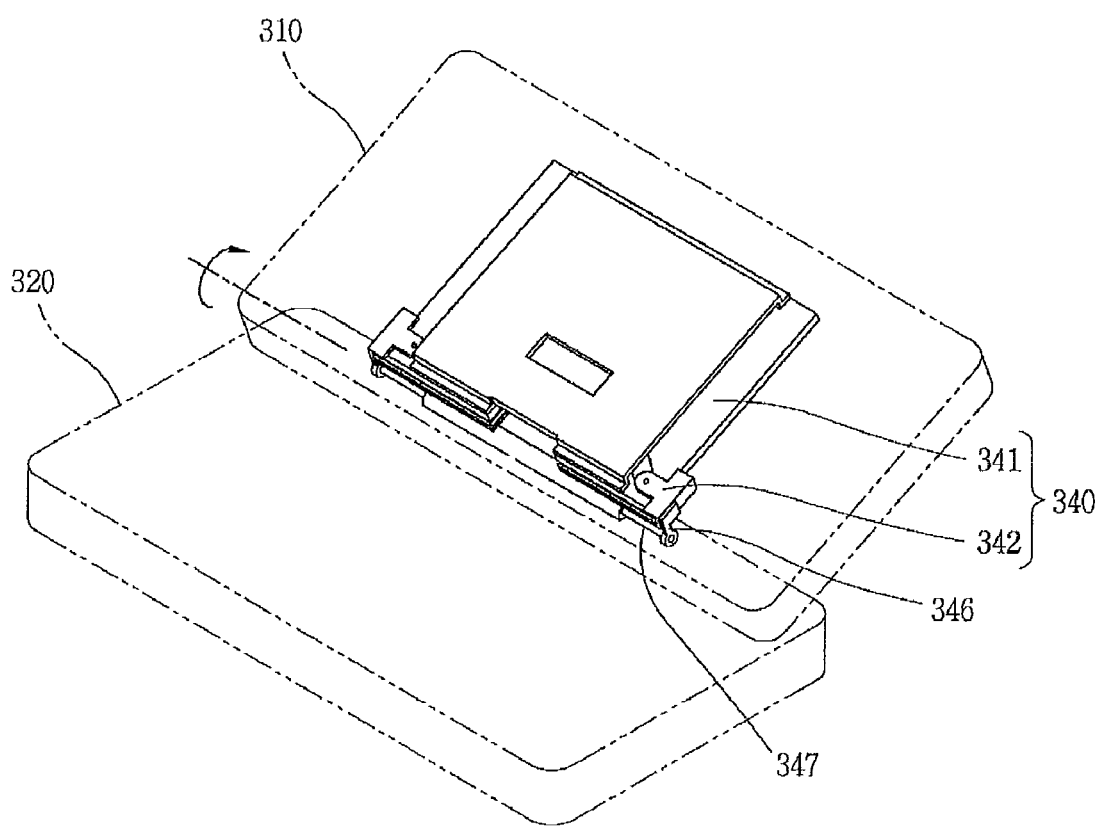
FIG. 14 is a perspective view of the mobile terminal of FIG. 13 with the first and second bodies shown in dashed lines.

FIG. 13 is a perspective view of a mobile terminal with a slide module 340 according to a third exemplary embodiment of the present invention, and FIG. 14 is a perspective view of the mobile terminal of FIG. 13 with the first and second bodies shown in dashed lines. In this exemplary embodiment, the slide module 340 is configured to stand the first body 310 at a certain angle with respect to the second body 320.

With reference to FIG. 14, an end portion of the second slide member 342 is connected to the second body 320 with a hinge connection unit 346. The hinge connection unit 346 includes a rotational shaft 347 provided on the second body 320, and the second slide member 342 may be rotated about the rotational shaft 347. With such a configuration, the first slide member 341 is moved on the second slide member 342 from the closed position to the open position, and then, the second slide member 342 is rotated at a certain angle with respect to the second body 320.

Accordingly, after the first body 310 is moved from the closed position to the open position, it can be positioned in a third configuration in which the first body 310 is stood at a certain angle with respect to the second body 320. When the user inputs information via a second display unit 323 of the second body 320 in the third configuration, the hinge connection unit 346 may allow the user to adjust the angle at which the first body 310 is positioned relative to the second body 320 depending upon how the user wishes to view the first display unit 313. In this exemplary embodiment of the mobile terminal 300, the hinge connection unit 346 can be applied to any of the foregoing slide modules described above.

Figure 15:
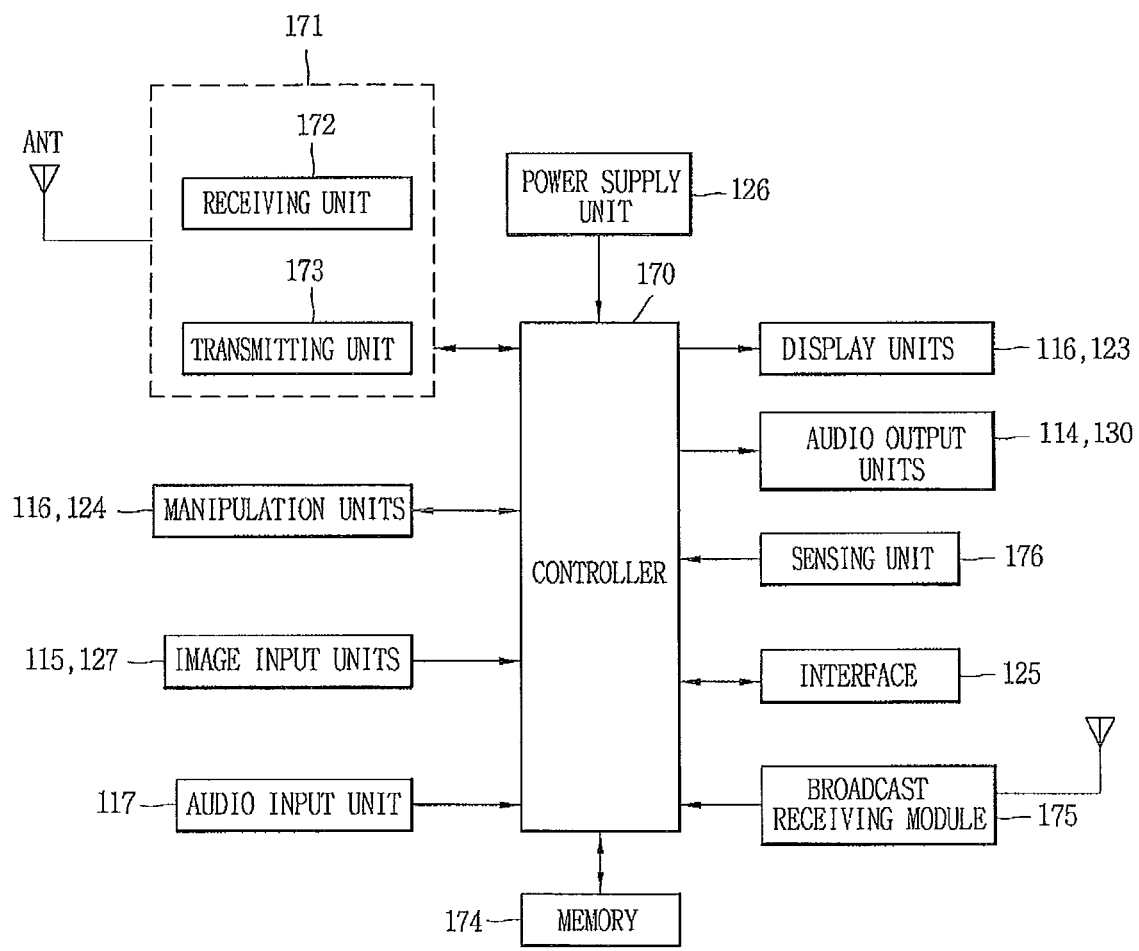
FIG. 15 is a schematic block diagram of a mobile terminal according to an exemplary embodiment of the present invention.

FIG. 15 is a schematic block diagram of a mobile terminal according to an exemplary embodiment of the present invention. With reference to FIG. 16, the mobile terminal according to the exemplary embodiment of the present invention includes a wireless communication module 171, manipulation units 116 and 124, image input units 115 and 127, an audio input unit 117, display units 116 and 123, audio output units 114 and 130, a sensing unit 176, an interface 125, a broadcast receiving module 175, a memory 174, a power supply unit 126, and a controller 170.

The controller 170 controls the general operation of the mobile terminal. For example, the controller 170 performs controlling and processing related to a voice call, data communication, a video call, or the like.

The wireless communication module 171 transmits/receives a radio signal to/from a mobile communication base station via an antenna. For example, the wireless communication module 171 includes a transmitting unit 173 that handles transmission/reception of voice data, character data, image data and control data, modulates a signal to be transmitted, and transmitting of the modulated signal. The wireless communication module 171 also includes a receiving unit 172 that demodulates a received signal, under the control of the controller 170.

The manipulation units 116 and 124 are configured as shown in FIG. 1, and provide key input data inputted to the controller 170 to control the operation of the mobile terminal by the user.

The image input units 115 and 127 may process image frames such as still images or video acquired by an image sensor in a video call mode or an image capture mode. The processed image frames may be converted into image data that can be displayed on the display units 116 and 123 and then outputted to the display unit 116 and 123. The image frames processed by the image input units 115 and 127 may be stored in the memory 174 or transmitted externally via the wireless communication module 171 under the control of the controller 170.

The audio input unit 117 may receive external audio signals via a microphone in a phone call mode, a recording mode, a voice recognition mode, or the like, and process the received audio signals into electrical voice data. In the phone call mode, the processed voice data is converted into a form that can be transmitted to a mobile communication base station via the wireless communication module 171, and then transmitted to the wireless communication module 171. In the recording mode, the processed voice data is outputted to be stored in the memory 174. The audio input unfit 117 may include various types of noise canceling (or suppression) algorithms to cancel (or suppress) noise generated in the course of receiving and transmitting audio signals.

The display units 116 and 123 may output information processed in the mobile terminal. For example, when the mobile terminal 100 is in the phone call mode, the display units 116 and 123 may display a User Interface (UI) or a Graphic User Interface (GUI) associated with a call or other communication under the control of the controller 170. When the mobile terminal 100 is in the video call mode or the image capture mode, the display units 116 and 123 may display a captured image, a UI, a GUI, and the like, under the control of the controller 170. If the display units 116 and 123 are configured to have a touch screen, they may also be used as an input device.

The audio output units 114 and 130 may convert audio data received from the wireless communication module 171 or stored in the memory 174 and output the converted data in a call signal reception mode, a phone call mode, a recording mode, a voice recognition mode, a broadcast reception mode, and the like, under the control of the controller 170. Also, the audio output units 114 and 130 may provide audible outputs related to a particular function (e.g., a call signal reception sound, a message reception sound, etc.) performed by the mobile terminal.

The sensing unit 176 detects a current status (or state) of the mobile terminal such as an open/close state of the mobile terminal, a location of the mobile terminal, presence or absence of user contact with the mobile terminal, etc., and generates a sense (control) signal for controlling the operation of the mobile terminal. For example, when the mobile terminal is a slide phone, opening/closing of the slide phone is sensed and the sensing results are outputted to the controller

170 to control the operation of the terminal. In addition, the sensing unit 176 can perform a sensing function as to whether or not the power supply unit 128 supplies power or whether or not the interface 125 is coupled with an external device.

The interface 125 may serve as an interface with at least one external device connected with the mobile terminal. For example, the external devices may include wired/wireless headsets, external power chargers, wired/wireless data ports, card sockets (e.g., for receiving a memory card, a SIM/UIM card, etc.), and the like. The interface 125 may be used to receive inputs (e.g., data, information, power, etc.) from an external device and transfer the received inputs to one or more elements within the mobile terminal, or may be used to transfer data from the mobile terminal to another external device.

The memory 174 may store programs or the like used for the processing and controlling performed by the controller 170, or may temporarily store inputted/outputted data (e.g., a phonebook, messages, still images, video, etc.). Also, the memory 174 stores a program that controls the operations of the mobile terminal 100 according to the present invention. The memory 174 may include at least one type of storage medium including a hard disk type, a card-type memory (e.g., SD or XD memory, etc), a flash memory, a Random Access Memory (RAM), a Read-Only Memory (ROM), and the like.

The broadcast receiving module 175 may receive a broadcast signal transmitted through a satellite or terrestrial means, convert the same into a broadcast data format that can be outputted to the audio output units 114 and 130 and the display units 116 and 123, and output the converted data to the controller 170. In addition, the broadcast receiving module 175 may receive supplementary data (e.g., Electronic Program Guide (EPG), a channel list, etc.) associated with a broadcast. The broadcast data and supplementary data converted by the broadcast receiving module 175 may be stored in the memory 174.

The power supply unit 126 is provided with internal or external power and supplies power required for operations of the elements under the control of the controller 170.

As so far described, the slide module and the mobile terminal having the same according to the present invention have several advantages. First, because the cover unit is provided to open and close the connector hole according to the relative movement of the first and second slide modules, the relative movement distance of the first and second bodies can be increased without affecting the fine view of the mobile terminal.

Second, because the elasticity providing unit for applying elastic force to the first and second slide members is disposed between the first slide member and the first body, the elasticity providing unit is not exposed in the open position.

Third, because the first and second display units are provided at the first and second bodies to allow inputting of information by touching visual information, more convenience interface environment can be provided to users.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
 a first body;
 a second body slidably moveable with respect to the first body such that the first body is moved between a closed position and an open position;
 a connector electrically connecting the first body to the second body; and
 a slide module connecting the first body to the second body to allow the second body to move with respect to the first body between the closed position and the open position, the slide module including:
  a first slide member connected to the first body;
  a second slide member connected to the second body, the second slide member being slidably connected to the first slide member; and
  a cover unit disposed between the first and second slide members, the cover unit being configured to prevent exposure of the connector when the first body is in the open position, the cover unit configured to translate linearly with respect to the first and second bodies throughout movement between the closed position and the open position.

2. The mobile terminal of claim 1, wherein the first slide member includes a connector hole to receive a portion of the connector when the first body is in the closed position.

3. The mobile terminal of claim 2, wherein the cover unit covers and uncovers the connector hole according to relative movement of the first and second slide members.

4. A mobile terminal comprising:
 a first body;
 a second body slidably moveable with respect to the first body such that the first body is moved between a closed position and an open position;
 a connector electrically connecting the first body to the second body; and
 a slide module connecting the first body to the second body to allow the second body to move with respect to the first body between the closed position and the open position, the slide module including:
  a first slide member connected to the first body, the first slide member including a connector hole to receive a portion of the connector when the first body is in the closed position;
  a second slide member connected to the second body, the second slide member being slidably connected to the first slide member; and
  a cover unit disposed between the first and second slide members, the cover unit being configured to prevent exposure of the connector when the first body is in the open position, the cover unit covers and uncovers the connector hole according to relative movement of the first and second slide members, the cover unit including:
   a cover body unit slidably connected to at least one of the first and second slide members to slidably cover and uncover the connector hole; and
   a connection unit configured to connect the cover body unit to the second slide member such that the second slide member is configured to move a first distance with respect to the first slide member independently of the cover body unit and to move a second distance with respect to the first slide member together with the cover body unit.

5. The mobile terminal of claim 4, wherein the connection unit includes a torsion spring having one end connected to the second slide member and the other end connected to the cover body unit.

6. The mobile terminal of claim 5, wherein the second slide member is configured to move the first distance while the torsion spring is compressed, whereby the cover body unit covers the connector hole, and to move the second distance with the cover body unit to uncover the connector hole when the torsion spring is not compressed.

7. The mobile terminal of claim 4, wherein the connection unit includes:
- a slot formed in the cover body unit such that the slot extends in the direction of movement of the second slide member; and
- a protrusion formed on the second slide member, the protrusion configured to move along the slot.

8. The mobile terminal of claim 7, wherein the second slide member is configured to move a first distance separately from the cover body unit such that the cover body unit covers the connector hole and to move a second distance with the cover body unit to uncover the connector hole when the protrusion is caught at one end of the slot.

9. The mobile terminal of claim 1, wherein the slide module further includes an elasticity providing unit to apply elastic force to assist in moving the first body between the closed and open positions according to the relative movement of the first and second slide members.

10. The mobile terminal of claim 9, wherein the elasticity providing unit is disposed between the first body and the first slide member.

11. The mobile terminal of claim 9, wherein the first slide member further includes a cover member that covers the cover unit and the elasticity providing unit, the cover member connecting the first slide member to the first body.

12. The mobile terminal of claim 1, wherein at least a portion of the second body is exposed when the first body is in the open position and said at least a portion of the second body is covered when the first body is in the closed position.

13. The mobile terminal of claim 1, wherein the connector includes a flexible printed circuit board that is deformed during relative movement of the first and second bodies.

14. The mobile terminal of claim 1, wherein the slide module further includes a hinge connection unit configured to position the first body at a certain angle greater that 0° with respect to the second body.

15. The mobile terminal of claim 1, wherein the first body includes a first display, the second body includes a second display, and the first and second display units are configured to receive user inputs via touching of displayed information.

16. A slide module for a mobile terminal having a first body, a second body slidably connected to the first body such that the first body is moveable between a closed position and an open position, and a connector electrically connecting the first body to the second body, the slide module comprising:
- a first slide member connectable to the first body;
- a second slide member connectable to the second body, the first slide member being slidably connected to the second slide member to allow the first and second bodies to move between the closed and open position, the first and second slide members being configured to allow the connector to pass therethrough; and
- a cover unit configured to prevent exposure of the connector when the first body is in the open position, the cover unit being disposed between the first and second slide members, the cover unit configured to translate linearly with respect to the first and second slide member throughout movement between the closed position and the open position.

17. The slide module of claim 16, further comprising a connector hole formed in the first slide member, the connector hole being configured to receiving a portion of the connector when the first body is in the closed position.

18. The slide module of claim 17, wherein the cover unit covers and uncovers the connector hole according to relative movement of the first and second slide members.

19. The slide module of claim 18, wherein the cover unit includes:
- a cover body unit slidably connected to at least one of the first and second slide members to slidably cover and uncover the connector hole; and
- a connection unit configured to connect the cover body unit to the second slide member such that the second slide member is configured to move a first distance with respect to the first slide member independently of the cover body unit and to move a second distance with respect to the first slide member together with the cover body unit.

20. The slide module of claim 19, wherein the connection unit includes a torsion spring having one end connected to the second slide member and the other end connected to the cover body unit.

21. The slide module of claim 19, wherein the connection unit includes:
- a slot formed in the cover body unit such that the slot extends in the direction of movement of the second slide member; and
- a protrusion formed on the second slide member, the protrusion configured to move along the slot.

* * * * *